US006943680B2

(12) United States Patent
Ward, Jr.

(10) Patent No.: US 6,943,680 B2
(45) Date of Patent: Sep. 13, 2005

(54) IDENTIFICATION SYSTEM INTERROGATOR

(75) Inventor: William H. Ward, Jr., Costa Mesa, CA (US)

(73) Assignee: Avid Identification Systems, Inc., Norco, CA (US)

( * ) Notice: Subject to any disclaimer, the term of this patent is extended or adjusted under 35 U.S.C. 154(b) by 198 days.

(21) Appl. No.: 10/003,387

(22) Filed: Oct. 22, 2001

(65) Prior Publication Data

US 2002/0053973 A1 May 9, 2002

Related U.S. Application Data

(62) Division of application No. 09/356,788, filed on Jul. 20, 1999, now Pat. No. 6,307,468.

(51) Int. Cl.$^7$ .............................. G08B 29/00; H04Q 5/22
(52) U.S. Cl. .................. 340/506; 340/505; 340/572.1; 340/572.7; 340/10.1
(58) Field of Search .................... 340/506, 505, 340/572.2, 572.3, 572.4, 572.5, 10.1, 572.6, 10.3, 10.4, 10.51, 572.1, 573.1

(56) References Cited

U.S. PATENT DOCUMENTS

| | | |
|---|---|---|
| 3,022,492 A | 2/1962 | Kleist et al. |
| 3,299,424 A | 1/1967 | Vinding |
| 3,406,391 A | 10/1968 | Le Von, Jr. |
| 3,427,614 A | 2/1969 | Vinding |
| 3,440,633 A | 4/1969 | Vinding |
| 3,541,995 A | 11/1970 | Fathauer |
| 3,557,758 A | 1/1971 | Lack |
| 3,588,671 A | 6/1971 | Deboo |
| 3,689,885 A | 9/1972 | Kaplan et al. |
| 3,691,549 A | 9/1972 | Wilson |
| 3,720,883 A * | 3/1973 | Hess, Jr. et al. ............... 331/55 |
| 3,752,960 A | 8/1973 | Walton |
| 3,816,709 A | 6/1974 | Walton |
| 3,859,624 A | 1/1975 | Kriofsky et al. |
| 3,898,619 A | 8/1975 | Carsten et al. |
| 3,944,928 A | 3/1976 | Augenblick et al. |
| 3,964,024 A | 6/1976 | Hutton et al. |
| 4,040,053 A | 8/1977 | Olsson |
| 4,129,855 A | 12/1978 | Rodrian |
| 4,196,418 A | 4/1980 | Kip et al. |
| 4,201,960 A | 5/1980 | Skutta et al. |
| 4,209,783 A | 6/1980 | Ohyama et al. |
| 4,210,859 A | 7/1980 | Meretsky et al. |
| 4,242,663 A | 12/1980 | Slobodin |
| 4,247,758 A | 1/1981 | Rodrian |
| 4,333,072 A | 6/1982 | Beigel |
| 4,352,098 A | 9/1982 | Stephen et al. ............. 340/572 |
| 4,364,043 A | 12/1982 | Cole et al. |
| 4,384,281 A * | 5/1983 | Cooper ....................... 340/505 |
| 4,388,524 A | 6/1983 | Walton |
| 4,445,103 A | 4/1984 | Chass |
| 4,510,495 A | 4/1985 | Sigrimis et al. |
| 4,561,443 A | 12/1985 | Hogrefe et al. |

(Continued)

FOREIGN PATENT DOCUMENTS

WO    WO85/03831    8/1985

*Primary Examiner*—Donnie L. Crosland
(74) *Attorney, Agent, or Firm*—Squire, Sanders & Dempsey L.L.P.

(57) ABSTRACT

An improved interrogator for an inductively coupled identification system is disclosed. The interrogator provides a multidimensional electromagnetic field through a plurality of coils aligned relative to each other. The coils provide a rotating magnetic field having approximately constant amplitude regardless of orientation with respect to the transponder. An additional coil may be utilized to precess the multidimensional electromagnetic field. The interrogator may further provide an impedance matching network that includes a series drive capacitor to match the impedance of a capacitor in parallel with a coil to a driver load impedance.

45 Claims, 4 Drawing Sheets

U.S. PATENT DOCUMENTS

| | | | |
|---|---|---|---|
| 4,571,589 A | 2/1986 | Slocum et al. | |
| 4,602,253 A | 7/1986 | Kreft | |
| 4,625,730 A | 12/1986 | Fountain et al. | |
| 4,656,463 A | 4/1987 | Anders et al. | |
| 4,691,202 A | 9/1987 | Denne et al. | |
| 4,700,179 A | 10/1987 | Fancher | 340/572 |
| 4,724,427 A | 2/1988 | Carroll | |
| 4,730,188 A | 3/1988 | Milheiser | |
| 4,752,776 A | 6/1988 | Katzenstein | |
| 4,787,384 A | 11/1988 | Campbell et al. | |
| 4,837,568 A | 6/1989 | Snaper | |
| 4,857,893 A | 8/1989 | Carroll | |
| 4,864,633 A | 9/1989 | Chatelot | |
| 4,899,157 A | 2/1990 | Sanford et al. | |
| 5,005,001 A * | 4/1991 | Cordery | |
| 5,008,661 A | 4/1991 | Raj | |
| 5,012,236 A | 4/1991 | Troyk et al. | |
| 5,025,550 A | 6/1991 | Zirbes et al. | |
| 5,041,826 A | 8/1991 | Milheiser | |
| 5,049,857 A | 9/1991 | Plonsky et al. | 340/551 |
| 5,050,292 A | 9/1991 | Zirbes et al. | |
| 5,084,699 A | 1/1992 | DeMichele | |
| 5,095,309 A | 3/1992 | Troyk et al. | |
| 5,103,222 A | 4/1992 | Hogen Esch et al. | |
| 5,151,684 A | 9/1992 | Johnsen | |
| 5,166,676 A | 11/1992 | Milheiser | |
| 5,193,539 A | 3/1993 | Schulman et al. | |
| 5,193,540 A | 3/1993 | Schulman et al. | |
| 5,211,129 A | 5/1993 | Taylor et al. | |
| 5,214,409 A | 5/1993 | Beigel | |
| 5,266,926 A | 11/1993 | Beigel | |
| 5,404,101 A | 4/1995 | Logue | |
| 5,414,410 A | 5/1995 | Davies et al. | 340/551 |
| 5,894,266 A | 4/1999 | Wood, Jr. et al. | 340/539 |
| 6,060,988 A * | 5/2000 | Copeland et al. | 340/572.1 |
| 6,118,378 A | 9/2000 | Balch et al. | 340/572.7 |
| 6,166,706 A * | 12/2000 | Gallagher, III et al. | 343/867 |
| 6,307,468 B1 * | 10/2001 | Ward, Jr. | 340/505 |

\* cited by examiner

IDENTIFICATION SYSTEM INTERROGATOR

This is a Divisional Application of U.S. application Ser. No. 09/356,788, filed Jul. 20, 1999, now U.S. Pat. No. 6,307,468 issued Oct. 23, 2001.

BACKGROUND OF THE INVENTION

1. Field of the Invention

The present invention relates to a cooperative identification system, and more particularly, to an interrogator or reader for inductively coupling to a transponder and thereby extract data from the transponder. The interrogator features a multidimensional electromagnetic field generation capability and an antenna impedance matching network.

2. Description of Related Art

In the automatic data identification industry, the use of cooperative identification systems, that include an interrogator (also known as a reader) and a transponder (also known as a tag), have grown in prominence as a way to track objects and/or data regarding an object to which the transponder is affixed. A transponder generally includes a semiconductor memory, in which digital information may be stored. Using a technique known as inductive coupling, a transponder provides the stored data to an interrogator in response to an electromagnetic field that is generated by the interrogator. This type of inductively coupled identification system is very versatile. The transponders may be passive, in which they extract their power from the electromagnetic field provided by the interrogator, or active, in which they include their own power source. The passive transponders can be either "half-duplex" or "full-duplex" transponders, which can be manufactured in very small, lightweight, and inexpensive units. Passive transponders are particularly cost effective because they lack an internal power source. The interrogator-transponder systems can be made to operate in a wide range of frequencies, from kilohertz to gigahertz. The interrogator may be portable and powered by a small battery, or fixed and powered by a battery or AC power.

In view of these advantages, inductively coupled identification systems are used in many types of applications in which it is desirable to track information regarding a moving or inaccessible object. Various applications may include asset and inventory control, access control, security, and transportation applications such as vehicle toll collection, parking, and fleet management. Another application is to affix transponders to animals in order to provide information such as their health, behavior, or location. One method of attaching the transponder is to implant the transponder within the animal. For example, the transponder may be implanted beneath the skin of the animal or the transponder may be designed such that, when swallowed, it remains in the stomach or digestive tract of the animal. Passive transponders are uniquely suited for this type of application because they do not require an internal power source such as a battery that can wear out.

The inductively coupled identification system may utilize an interrogator that generates through a field coil an electromagnetic field for inductively coupling to a transponder. The transponder may be passive and have a memory device coupled to an inductive coil that serves both as the antenna and inductive power supply to draw power from a generated electromagnetic field to supply the transponder's electrical circuits. One method of providing data to the interrogator is for the transponder to retransmit the identification data to the interrogator. This approach requires the use of transmission and reception circuitry in both the interrogator and the transponder. Alternatively, because it is desirable to miniaturize the transponder, it is beneficial to eliminate as many parts in the transponder as possible. Thus, another method of providing the data to the interrogator is to provide a variable load within the transponder. To decode the data, the interrogator measures the power output of the interrogator and loading by the transponder. The modulated power signal is decoded to separate the data element for later digital interpretation.

A drawback of conventional inductively coupled identification systems is that the inductive coupling between the transponder's inductive coil and the electromagnetic field, generated by the interrogator's field coil, may depend on the relative angle between the interrogator's field coil and the transponder's inductive coil. If the interrogator's field coil and the transponder's inductive coil are aligned in parallel, then inductive coupling is maximized. However, if they are perpendicular, then inductive coupling is negligible and the inductive coupling is less effective. This means that conventional identification systems operate most effectively when the interrogator and transponder coils are aligned parallel to each other. As discussed above, inductively coupled identification systems are utilized in many types of applications, with the exact orientation of the transponder often being unknown. If the transponder's inductive coil is oriented nearly perpendicular to the magnetic field generated by the interrogator, there may be insufficient inductive coupling for correct operation. Thus, the interrogator may be unable to obtain the data within a transponder, even though it is within the interrogator's electromagnetic field range, because the interrogator's field coil and the transponder's inductive coil are not properly aligned.

Another drawback of inductively coupled identification systems is the antenna impedance matching network. An interrogator may utilize a capacitor in series with an inductor, a series resonant LC circuit, to generate the magnetic field. The magnitude of the magnetic field and, consequently, the effective range of the inductively coupled identification system, depends on the circulating energy between the inductor and the capacitor. The magnetic field alternates in amplitude because, as the magnetic field collapses, the energy stored in the magnetic field around the inductor coil is transformed and transitions into the capacitor as an electric field with the voltage increasing as the magnetic field collapses. When the voltage is at its maximum value, the capacitor discharges its energy in the form of a current through the inductor coil, regenerating the magnetic field in the opposite direction. This process repeats with losses generally due to the parasitic resistances of the components. The peak circulating power is determined by the product of the peak voltage and peak circulating current. The real power is determined by the circulating current squared times the effective resistance in the circuit. For a practical interrogator, the circulating power should be much larger than the real power, with the quality factor (Q) determined by the circulating power divided by the real power.

To interrogate (or "read") a transponder, the interrogator's magnetic field must be strong enough to activate the transponder. The maximum range is therefore effectively determined by the field amplitude, which is determined in turn by the circulating power in the field coil of the interrogator. For a given field coil area, the circulating power is determined by the number of ampere-turns. With a series resonant LC circuit, the switched current and the circulating current are identical. To minimize switching losses, the current may be kept low by increasing the number of turns and thus, also increasing the voltage. As an example, several thousand volts have been used in some applications. In general, there are many practical problems with operating above 500–1000 Volts: capacitors are expensive, corona and leakage currents consume power, and PC board traces must be widely spaced.

Interrogators may, alternatively, utilize a capacitor and inductor coil in parallel (a parallel resonant tank circuit) to avoid some of the problems, discussed above, for the series resonant LC circuit. The parallel resonant tank circuit would operate at a low voltage and a high current, but the voltage is then limited to that of the supply voltage. Additionally, the current may become large and difficult to effectively manage.

Accordingly, it would be desirable to provide an impedance matching network and multidimensional electromagnetic field coil for a transponder interrogator. The multidimensional electromagnetic field coil would provide an electromagnetic field that is capable of inductively coupling with a transponder regardless of its orientation with respect to the transponder. The impedance matching network would provide an appropriate impedance, given the interrogator's desired requirements, without resorting to the unreasonably high voltages or currents of conventional identification systems.

BRIEF SUMMARY OF THE INVENTION

In accordance with the teachings of the present invention, an impedance matching network and multidimensional electromagnetic field coil for an interrogator are provided. The improved interrogator provides a multidimensional electromagnetic field through two coils aligned preferably perpendicularly to each other. The coils are energized so as to provide a rotating magnetic field having approximately constant amplitude regardless of its orientation with respect to the transponder. An additional coil may be provided to precess the rotating magnetic field. The interrogator may further provide an impedance matching network that includes a series drive capacitor to match the impedance of a capacitor in parallel with a coil (parallel resonant tank circuit) to a driver's output impedance.

DETAILED DESCRIPTION OF THE PREFERRED EMBODIMENT

Figure 1:
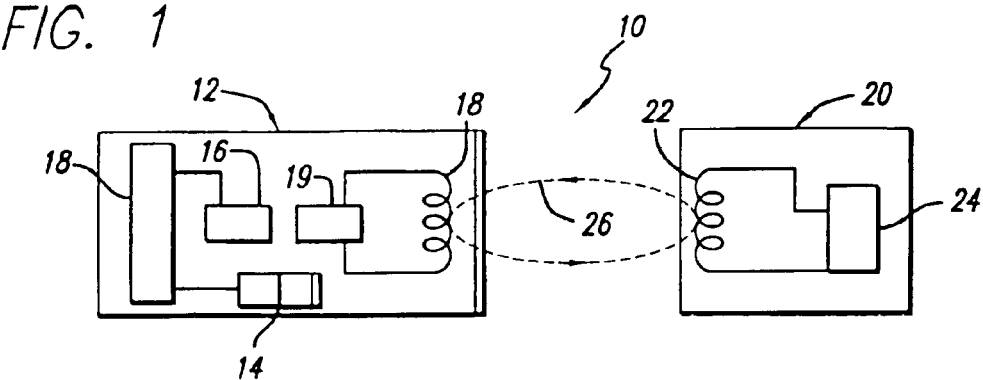
FIG. 1 is a block diagram of an inductively coupled identification system.

The present invention satisfies the need for an impedance matching network and multidimensional electromagnetic field coil for a radio frequency identification (RFID) interrogator. The multidimensional electromagnetic field coil provides an electromagnetic field that is capable of inductively coupling with a transponder regardless of its orientation with respect to the transponder. The impedance matching network provides an appropriate impedance, given the interrogator's desired requirements, without resorting to the unreasonably high voltages or currents of conventional identification systems. In the detailed description of the interrogator of the present invention that follows, it should be appreciated that like reference numerals are used to identify like elements illustrated in one or more of the figures.

Referring first to FIG. 1, a block diagram of an inductively coupled identification system 10 is illustrated. The identification system 10 includes an interrogator 12 and a transponder 20. The interrogator 12 may be handheld and include a battery 18 to supply power to the interrogator 12 and allow for mobility and ease of use. An on-off switch 14 allows battery conservation by turning the interrogator 12 off when not in use. A display screen 16 may be included to provide a user with information concerning operation of the interrogator 12 along with information obtained from the transponder 20.

The interrogator 12 reads or interrogates the transponder 20 by generating an electromagnetic field using associated electronics 19 and a coil 18 that inductively couples 26 with a coil 22 in the transponder 20. By inductively coupling, the transponder 20 can communicate its stored information using electrical circuitry 24 within the transponder 20.

Figure 2:
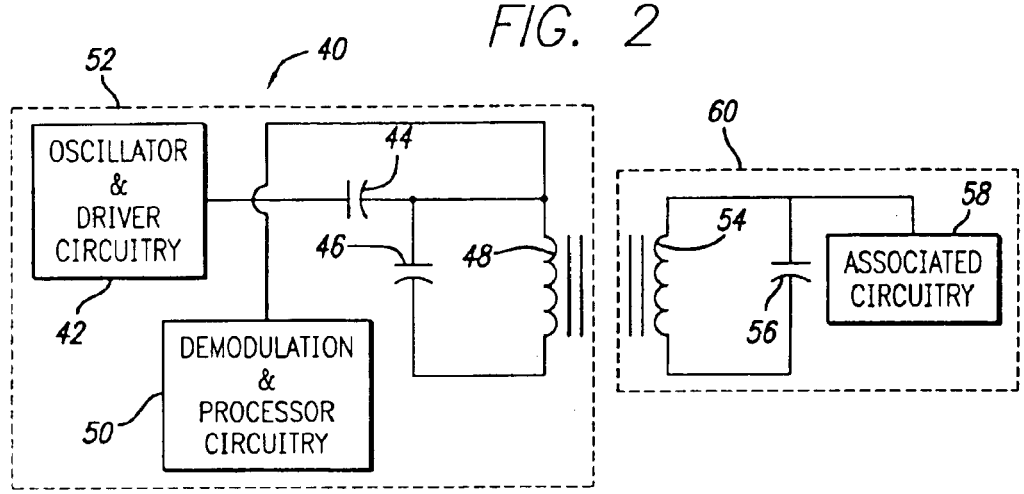
FIG. 2 is a block diagram of an antenna impedance matching network for an inductively coupled identification system in accordance with a first embodiment of the present invention.

FIG. 2 shows a block diagram of an antenna impedance matching network for an inductively coupled identification system 40 in accordance with a first embodiment of the present invention. The identification system 40 includes an interrogator 52 and a transponder 60. The interrogator 52 includes various associated oscillator and coil driver circuitry 42 that provides a signal to a series drive capacitor 44 and then to a tank capacitor 46 and a coil 48. The series drive capacitor 44, the tank capacitor 46, and the coil 48 may be viewed as the emitter for an inductive coupling device, such as the interrogator 52. The signal from the transponder 60 is picked up from the coil 48 and demodulation and processor circuitry 50 process the signal into the desired form for a user of the interrogator 52. The transponder 60 includes a coil 54 and a tank capacitor 56 that is linked to associated circuitry 58. The coil 48 and the coil 54 inductively couple so that the interrogator 52 can read the information stored within the transponder 60.

The antenna impedance matching network shown in FIG. 2 overcomes many of the limitations of prior series resonant LC circuits and parallel resonant tank circuits. Depending upon the desired application and requirements for an interrogator 52, the preferred method of determining values for the antenna impedance matching network is to select the required circulating power level, determine the most practical combination of current and voltage yielding that power level, and then drive the tank capacitor 46 and the coil 48 (parallel resonant tank circuit) designed for the selected specifications through the series drive capacitor 44 that matches the impedance. As is generally understood, practical devices have elements or characteristics which dissipate real power. Therefore, only the portion of the circulating current required due to various losses, which include these losses inherent in practical devices, is supplied by the series drive capacitor 44, while the remaining portion of the circulating current is supplied by the tank capacitor 46. This effectively transforms the low impedance of the parallel resonant tank circuit to a useful level at the series drive capacitor 44.

Specifically, the sum of the capacitance for the series drive capacitor 44 and the tank capacitor 46 should be equal to the capacitance required to resonate the coil 48 at the desired frequency, while their ratio is approximately the square root of the impedance transformation required. This relationship is set forth in the following equations:

$$C_{resonance} = C_{tank} + C_{drive};$$

$$C_{tank}/C_{drive} = \text{Square root (Driver load impedance}/R_{coil});$$

where $C_{resonance}$ is the desired resonance frequency, $C_{tank}$ is the capacitance of the tank capacitor 46, $C_{drive}$ is the capacitance of the series drive capacitor 44, Driver load impedance is the impedance required for a matched load and $R_{coil}$ is the resistance of the coil.

As an example, assume 1 kilowatt of peak circulating power is required at 125 kilohertz and the maximum peak-to-peak voltage must be less than or equal to 500 volts, or a peak voltage of 250 volts. Using basic science and the formulas discussed above, the peak circulating current is calculated as 1 kilowatt divided by 250 volts, which equals 4 amps. The required impedance is calculated as 250 volts divided by 4 amps, which equals 62.5 ohms.

At resonance, inductive reactance (XL) equals capacitive reactance (XC), which was calculated as equal to 62.5 ohms. Using the following equations:

$$C = (1)/[(2)(pi)(\text{frequency})(XC)];$$

$$L = (XL)/[(2)(pi)(\text{frequency})];$$

it is determined that a 0.02 microfarad capacitor in parallel with a 79 microhenry coil will form a resonant circuit at 125 kilohertz with an impedance of 62.5 ohms. Next assume that the resistance of a 79 microhenry coil is 0.4 ohms and that the power source driving the circuit is 9 volts. The Q of the circuit is the reactance divided by the resistance, or 62.5 ohms divided by 0.4 ohms, which equals 156.

The peak circulating power was given as 1 kilowatt or 4 amps peak at 250 volts peak. Because the real power equals the circulating power divided by the Q, or 1 kilowatt divided by 156, the real power equals 6.4 watts of peak DC power, or 4.5 watts RMS, which at 9 volts requires 0.5 amps of average current. This results in an optimum drive impedance of 9 volts divided by 0.5 amps, which equals 18 ohms. However, the actual coil resistance was given as 0.4 ohms, thus 18 ohms needs to be transformed to 0.4 ohms, a ratio of 45 to 1. The capacitor ratio between the tank capacitor and the series drive capacitor equals the square root of the impedance ratio, as discussed above, which equals 6.7 to 1. Therefore, with the total capacitance needed for resonance at 125 kilohertz calculated above as 0.02 microfarad, the series drive capacitor value will be 1/6.7 of 0.02 microfarad, which equals 0.003 microfarad. The tank capacitor will be 0.02 microfarad minus 0.003 microfarad, which equals 0.017 microfarad.

It should be understood that the above example gives only an estimate of the actual capacitance ratio required. The example assumes ideal waveforms and no switching or dielectric losses. The example is provided to demonstrate that a pair of capacitors can be chosen that will efficiently match the drive circuitry to a desired impedance without resorting to unreasonably high voltages or currents, as in the prior art. Additionally, one capacitor may be a variable capacitor to provide tuning capability to adjust the resonant frequency.

Figure 3:
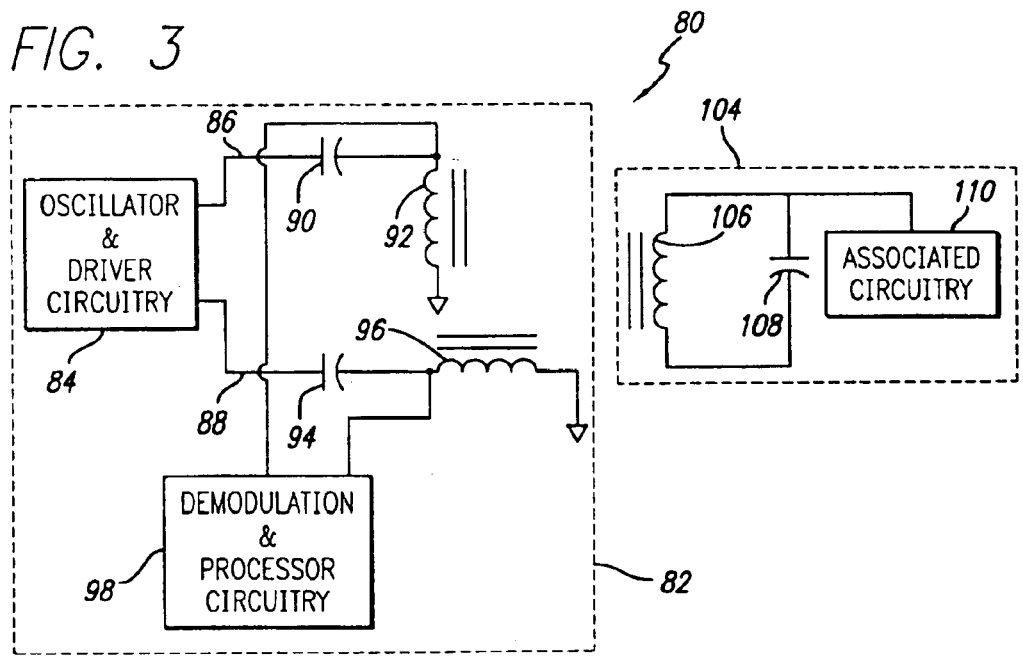
FIG. 3 is a block diagram of a multidimensional electromagnetic field coil for an inductively coupled identification system in accordance with a second embodiment of the present invention.

FIG. 3 shows a block diagram of a multidimensional electromagnetic field coil for an inductively coupled identification system 80 in accordance with a second embodiment of the present invention. The identification system 80 includes an interrogator 82 and a transponder 104. The interrogator 82 includes various associated oscillator and coil driver circuitry 84 that provides an in-phase channel 86 and a quadrature-phase channel 88. The in-phase channel 86 provides a signal to a series resonant circuit that includes a series capacitor 90 and a coil 92. The quadrature-phase channel 88 provides a signal to a series resonant circuit that includes a series capacitor 94 and a coil 96. The coil 92 and the coil 96 are aligned preferably perpendicular to each other.

The transponder 104 includes a coil 106 and a tank capacitor 108 that is linked to associated circuitry 110. Similarly as discussed above, the coil 92 and/or the coil 96 inductively couple with the coil 106 so that the interrogator 82 can read the information stored within the transponder 104. The signal from the transponder 104 is picked up from the coil 92 and/or the coil 96 and demodulation and processor circuitry 98 process the signals into the desired form for a user of the interrogator 82.

The coil 92 and the coil 96 provide a rotating magnetic field, as opposed to alternating fields as in prior art devices. This results in there always being a magnetic field present from the two perpendicular coils 92, 96. Only the direction of the magnetic field changes, rather than the amplitude of the magnetic field, thus transponder 104 in the plane of the axes of the coils 92, 96 senses an alternating magnetic field of full amplitude regardless of the angle the coil 106 of transponder 104 with respect to the coils 92, 96 of interrogator 82. The net result is that the range of the interrogator 82 is relatively independent of the orientation of the transponder 104.

It should be understood that the magnetic field does not have to make a complete rotation in order to be effective; rather it must change direction sufficiently to capture transponders with unfavorable orientations. This would have applications such as in pass-through readers, which would not necessarily require a complete rotation of the magnetic field. Also, for pass-through readers and other types of applications, the coils 92, 96 may be spaced far apart from each other in order to cover a certain area or spaced close together in order to, for example, fit within a compact, portable interrogator. In addition, rather than utilizing the series capacitors 90, 94, a tank capacitor could be provided for each of the coils 92, 96, as discussed above to form two parallel resonant tank circuits, or the series capacitors 90, 94 along with the tank capacitors could be utilized to form an impedance matching network for the coils 92, 96.

Figure 4:
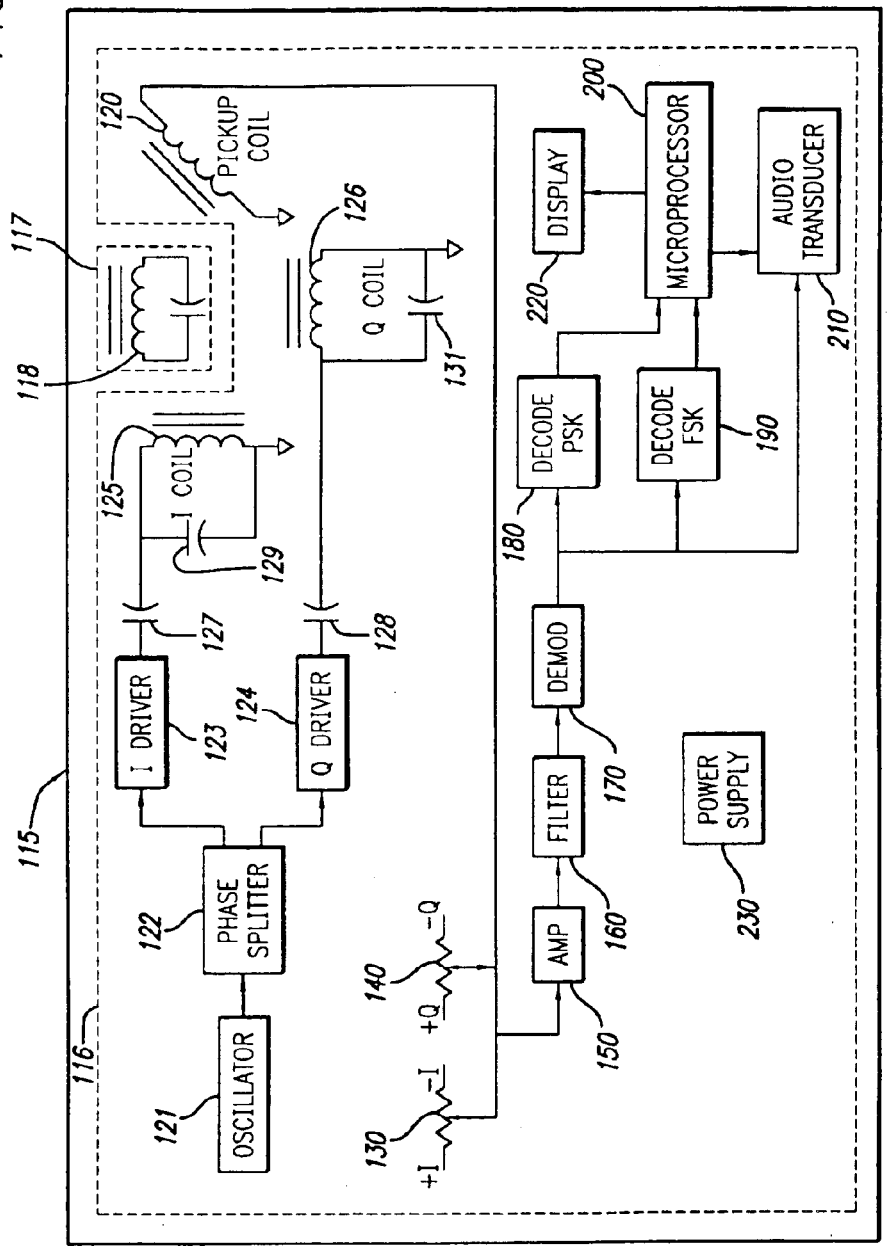
FIG. 4 is a block diagram of an inductively coupled identification system utilizing an antenna impedance matching network and a multidimensional electromagnetic field coil in accordance with a third embodiment of the present invention.

FIG. 4 shows a block diagram of an inductively coupled identification system 115 utilizing an antenna impedance matching network and a multidimensional electromagnetic field coil in accordance with a third embodiment of the present invention. The identification system 115 comprises an interrogator 116 and a transponder 117. The interrogator 116 includes an oscillator 121 that generates twice the carrier frequency, which is divided by two and split into two signals 90 degrees apart (in-phase and quadrature phase) by a phase splitter 122. The in-phase signal is sent to an in-phase (I) driver 123 and the quadrature phase signal is sent to a quadrature phase (Q) driver 124, where the signals are amplified in order to drive an in-phase coil 125 and a quadrature phase coil 126, respectively. The in-phase coil 125 and the quadrature phase coil 126 are driven through a series drive capacitor 127 and a series drive capacitor 128, respectively. The in-phase and quadrature phase coils 125, 126 are aligned preferably perpendicular to each other and preferably are caused to resonate at the carrier frequency by a tank capacitor 129 and a tank capacitor 131, respectively. The resonant frequency is determined, as discussed above, by the capacitance C of the parallel combination of each tank capacitor 129, 131, and its respective series drive capacitor 127, 128, along with the inductance L of the respective in-phase and quadrature phase coils 125, 126, respectively, according to the equation: $f=1/[(2)(pi)SQRT(LC)]$.

Because the in-phase and quadrature phase coils 125, 126 are oriented preferably perpendicular to each other and are driven by signals 90 degrees out of phase, the in-phase and quadrature phase coils 125, 126 each generate one component of a rotating composite magnetic field which in turn energizes a transponder 117. At any point off the rotational axis of the magnetic field, the amplitude of the magnetic field will be relatively constant, while the phase changes. The AC voltage induced in a coil 118 of the transponder 117 will thus be independent of the angle of the transponder 117 parallel to the plane of the magnetic field rotation.

The transponder 117 modulates its data into the generated magnetic field by absorbing more or less energy from the magnetic field, through the use of electronic circuitry not shown. This modulation is detected by a pickup coil 120 aligned at right angles to both the in-phase and quadrature phase coils 125, 126. Because the pickup coil 120 is preferably perpendicular to the in-phase and quadrature phase coils 125, 126, direct inductive coupling and the resulting interference from the carrier is minimized. The in-phase and quadrature phase coils 125, 126 may be optimized for low loss and high circulating power output, while the pickup coil 120 may be optimized for high sensitivity and wide bandwidth. Alternatively, rather than incorporating the pickup coil 120, the modulation may also be detected by the in-phase and quadrature phase coils 125, 126, as discussed above.

Any carrier frequency remaining in the signal from the pickup coil 120 is nulled by opposing signals from adjustment potentiometers 130, 140. The adjustment potentiometers 130, 140 provide an opposing signal from the in-phase and quadrature phase coils 125, 126, respectively. An amplifier 150 boosts the signal, a filter 160 reduces the out-of-band noise, and then a demodulator 170 extracts the subcarrier for further processing. A phase shift decoder (decode PSK) 180 and a frequency shift decoder (decode FSK) 190 further decode the subcarrier with the appropriate methods to extract the data bits and transfer them into a microprocessor 200. The microprocessor 200 checks the data bits for validity, decrypts them if necessary, and formats them into readable form for a display 220 or other output device.

If there is a transponder within range, there will be an audio signal present at the output of the demodulator 170, even if the data may not be decodable. Sending the audio signal to an audio transducer 210 enables the operator to move the interrogator 116 in the proper direction to maximize the audio tone and home in on the location of the transponder 117. The display 220 displays the decoded information, accompanied by a distinctive tone from the audio transducer 210 to alert the operator that data has been received. Finally, a power supply 230 is shown to provide power to the interrogator 116. The power source may be from a battery enclosed within the interrogator 116 in order to allow mobility or the power source may be external such as from a power supply source.

It should be understood that the various embodiments might be used singularly or in combination. For example in FIG. 4, a single drive coil may be utilized, such as the in-phase coil 125 with the quadrature phase coil 126 removed along with its associated electronics. This then provides, in accordance with an embodiment of the present invention, an impedance matching network. Furthermore, the pickup coil 120 could also be removed and the modulation from the transponder 117 detected from the in-phase coil 125, as in prior embodiments. Alternatively, in accordance with an embodiment of the present invention, the interrogator 116 could operate without the impedance matching network. The in-phase and quadrature phase coils 125, 126 would each be driven through a series capacitor or a parallel capacitor, but the multidimensional electromagnetic field, in accordance with an embodiment of the present invention, would still be provided through the in-phase and quadrature phase coils 125, 126. In addition, most of the circuits shown have used single-ended coil drivers, but push-pull or H-bridge drivers, as known in the art, along with other equivalent devices could also be used in conjunction with the impedance matching network and/or coils generating the multidimensional electromagnetic field.

In general, as shown in FIG. 4, the interrogator 116 represents an improvement for reading passive transponders. The rotating magnetic field may be generated by a plurality of coils and may be driven from a polyphase AC source to activate transponders within range. The modulation from the transponder 117 may be derived from the in-phase and quadrature phase coils 125, 126 or the pickup coil 120 may be utilized to detect the returned magnetic field modulation from the transponder 117.

If the axis of the coil 118 of the transponder 117 is oriented precisely perpendicular to the field lines of both the in-phase and quadrature phase coils 125, 126, such as along the axis of field rotation, no voltage will be induced in the coil 118. For this example, the transponder 117 will probably not respond even though it is within range of the interrogator 116. Although the chance of this occurring may be small due to small movements of the interrogator 116 or the transponder 117 allowing inductive coupling to occur, an alternative embodiment of the present invention is provided for applications where this problem may arise.

Figure 5:
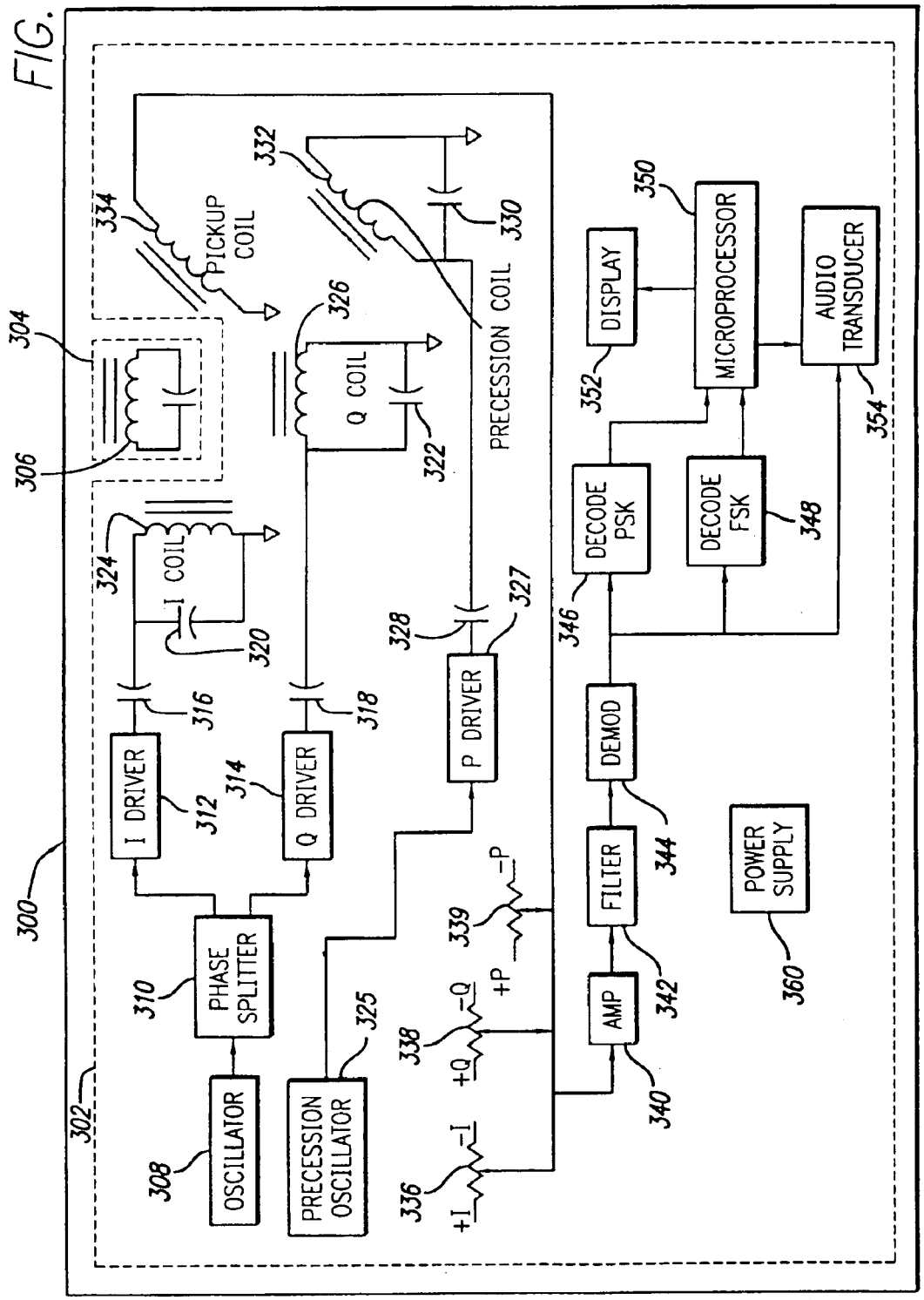
FIG. 5 is a block diagram of an inductively coupled identification system utilizing an antenna impedance matching network and a multidimensional electromagnetic field coil in accordance with a fourth embodiment of the present invention.

FIG. 5 shows a block diagram of an inductively coupled identification system 300 utilizing an antenna impedance matching network and a multidimensional electromagnetic field coil in accordance with a fourth embodiment of the present invention. The identification system 300 comprises an interrogator 302 and a transponder 304. The interrogator 302 includes an oscillator 308 that generates twice the carrier frequency, which is divided by two and split into two signals 90 degrees apart (in-phase and quadrature phase) by a phase splitter 310. The in-phase signal is sent to an in-phase (I) driver 312 and the quadrature phase signal is sent to a quadrature phase (Q) driver 314, where the signals are amplified in order to drive an in-phase coil 324 and a quadrature phase coil 326, respectively. A precession oscillator 325 also provides a signal that may be offset from the carrier frequency to a precession (P) driver 327, which amplifies the signal in order to drive a precession coil 332.

The precession coil 332 may be preferably oriented at right angles to both the in-phase and quadrature phase coils 324, 326 to precess the magnetic field rotational axis around the geometric axis of the antenna assembly. The precession coil 332 may be driven by the precession driver 327 with a frequency slightly offset from the carrier frequency, precessing the magnetic field rotational axis around the geometric axis at a rate equal to the difference between the frequency of the signal sent to the precession coil 332 and the carrier frequency sent to the in-phase and quadrature phase coils 324, 326. Because the magnetic field axis is continuously changing, the transponder 304 may be unresponsive or unfavorably aligned for only a short period of time. The precession frequency for the signal sent to the precession coil 332 may be selected so that it is slow enough to allow sufficient time to read or interrogate the transponder 304 during the active portion of each precession cycle, but fast enough to prevent unfavorable orientations existing and read the transponder 304 even with reasonable relative motion between the transponder 304 and the interrogator 302.

The in-phase coil 324, the quadrature phase coil 326, and the precession coil 332 are driven through a series drive capacitor 316, a series drive capacitor 318, and a series drive capacitor 328, respectively. The in-phase and quadrature phase coils 324, 326 are aligned preferably perpendicular to each other and preferably are caused to resonate at the carrier frequency by a tank capacitor 320 and a tank capacitor 322, respectively. As discussed above, the precession coil 332 will be aligned approximately perpendicular to the in-phase and quadrature phase coils 324, 326 and may also be resonated at the signal frequency desired for precession by a tank capacitor 330. The resonant frequency is determined, as discussed above, by the capacitance C of the parallel combination of each tank capacitor 320, 322, and 330, and its respective series drive capacitor 316, 318, and 328, along with the inductance L of the respective in-phase, quadrature phase, and precession coils 324, 326, and 332, respectively, according to the equation: $f=1/[(2)(\pi)\sqrt{LC}]$.

To visualize the precession brought about by the precession coil 332, assume the precession coil 332 is driven with a signal at exactly the carrier frequency (offset frequency equals zero) and in-phase with the in-phase coil 324. The resultant magnetic field from the combination of the in-phase coil 324 and the precession coil 332 will be the same as if the in-phase coil 324 were tipped slightly, i.e., angling the axis of the magnetic field away from the visualized geometric axis of the coil assembly. Now assume the phase of the drive signal to the precession coil 332 is changed to be in-phase with the quadrature phase coil 326. The magnetic field axis will now be tipped as if the quadrature phase coil 326 were tilted rather than the in-phase coil 324. Offsetting the precession coil drive frequency from the carrier frequency will continuously change the phase relative to the carrier frequency; thus, resulting in continuously precessing the magnetic field axis around the geometric axis at a rate equal to the frequency difference. The angle between the magnetic field axis and the geometric axis depends on the ratio between the precession coil drive amplitude and the carrier amplitude.

The transponder 304 modulates its data into the generated magnetic field by absorbing more or less energy from the magnetic field, through the use of electronic circuitry not shown. This modulation is detected by a pickup coil 334 aligned at right angles to both the in-phase and quadrature phase coils 324, 326 and parallel to the precession coil 332. Because the pickup coil 334 is preferably perpendicular to the in-phase and quadrature phase coils 324, 326, direct inductive coupling and the resulting interference from the carrier is minimized. The in-phase and quadrature phase coils 324, 326 may be optimized for low loss and high circulating power output, while the pickup coil 334 may be optimized for high sensitivity and wide bandwidth. Alternatively, rather than incorporating the pickup coil 334, the modulation may also be detected by the in-phase and quadrature phase coils 324, 326, as discussed above.

Any carrier frequency and precession frequency remaining in the signal from the pickup coil 334 is nulled by opposing signals from adjustment potentiometers 336, 338, and 339. The adjustment potentiometers 336, 338, and 339 provide an opposing signal from the in-phase, quadrature phase, and precession coils 324, 326, and 332, respectively. An amplifier 340 boosts the signal, a filter 342 reduces the out-of-band noise, and then a demodulator 344 extracts the subcarrier for further processing. A phase shift decoder (decode PSK) 346 and a frequency shift decoder (decode FSK) 348 further decodes the subcarrier with the appropriate methods to extract the data bits and transfer them into a microprocessor 350. The microprocessor 350 checks the data bits for validity, decrypts them, and formats them into human readable form for a display 352.

If there is a transponder within range, there will be an audio signal present at the output of the demodulator 344, even if the data may not be decodable. Sending the audio signal to an audio transducer 354 enables the operator to move the interrogator 302 in the proper direction to maximize the audio tone and home in on the location of the transponder 304. The audio transducer 354 may provide further tones or different types of tones depending upon the current status such as whether the transponder 304 is detected or decoded. The display 352 displays the decoded information, accompanied by a distinctive tone from the audio transducer 354 to alert the operator that data has been received. Finally, a power supply 360 is shown to provide power to the interrogator 302. The power source may be from a battery enclosed within the interrogator 302 in order to allow mobility or the power source may be external such as from a power supply source.

Figure 6:
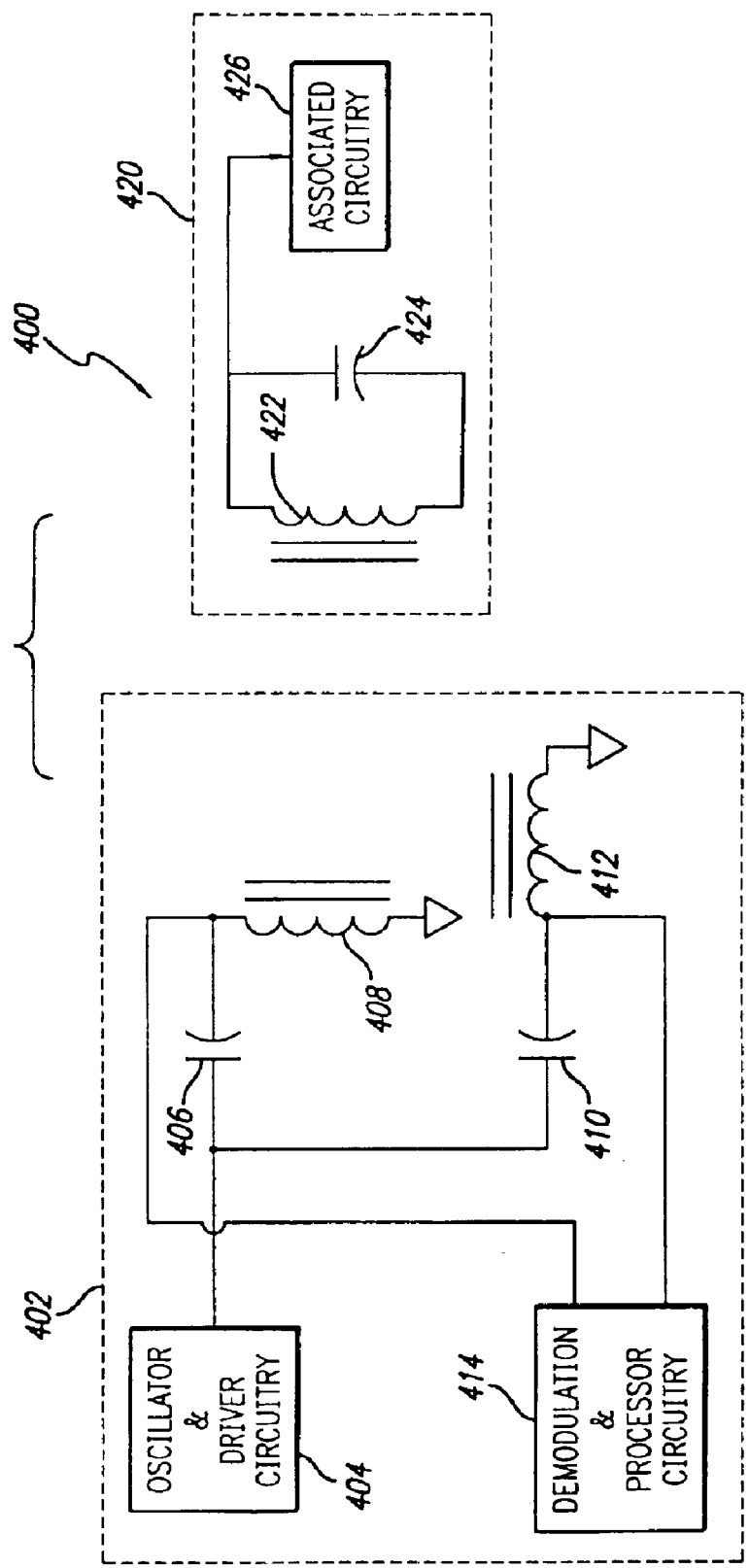
FIG. 6 is a block diagram of a multidimensional electromagnetic field coil for an inductively coupled identification system in accordance with a fifth embodiment of the present invention.

FIG. 6 illustrates a block diagram of a multidimensional electromagnetic field coil for an inductively coupled identification system 400 in accordance with a fifth embodiment of the present invention. The identification system 400 includes an interrogator 402 and a transponder 420. The interrogator 402 includes various associated oscillator and coil driver circuitry 404 to generate a signal for a pair of series resonant circuits that include a series capacitor 406 and a coil 408 and a series capacitor 410 and a coil 412. The coil 408 and the coil 412 are aligned preferably perpendicular to each other.

The transponder 420 includes a coil 422 and a tank capacitor 424 that is linked to associated circuitry 426. As discussed above, the coil 408 and/or the coil 412 inductively couple with the coil 422 so that the interrogator 402 can obtain the information stored within the transponder 420. The signal from the transponder 420 is picked up from the coil 408 and/or the coil 412 and demodulation and processor circuitry 414 process the signals into the desired form for a user of the interrogator 402.

The coil 408 and the coil 412 provide a rotating magnetic field from a single signal from the oscillator and driver circuitry 404. This is accomplished by adjusting the resonant frequency for the coil 408 and the capacitor 406 combination and also for the coil 412 and the capacitor 410 combination so that the resonant frequency for each combination is offset from the signal provided from the oscillator and driver circuitry 404. For example, the coil-capacitor combinations could be adjusted so that a 45 degree phase shift occurs for each, one coil-capacitor combination having a leading phase shift and the other coil-capacitor combination having a lagging phase shift. This results in a 90 degree phase shift between the corresponding magnetic fields generated by the coil 408 and the coil 412 and provides the rotating magnetic field that is formed by the magnetic fields from the coils 408, 412.

It should be understood that rather than utilizing the series capacitors 406, 410, a tank capacitor could be provided for each of the coils 408, 412, as discussed above to form two parallel resonant tank circuits, or the series capacitors 406, 410 along with the tank capacitors could be utilized to form an impedance matching network for the coils 408, 412. Furthermore, adjustable capacitors or inductors may be utilized in order to tune the circuits to the correct resonant frequency or phase shift.

Various extensions in accordance with the embodiments of the present invention discussed above may be made within the scope of the present invention. For example, a method or apparatus for an inductively coupled identification system may provide two or more coils for generating a corresponding magnetic field component for each coil. The coils may be closely spaced in order to, as an example, fit within a portable interrogator, or the coils may be spaced far apart, as an example, in order to provide coverage across a given area such as with pass-through readers. The corresponding magnetic field components form a composite magnetic field having a varying phase and substantially constant amplitude. The coils will be driven by a signal having a separate signal component corresponding to each coil, with the signal components offset in phase from each other by a certain amount or degree. The coils will be aligned relative to each other based on the degree of phase offset for each signal component so as to provide proper orientation to combine to form the composite magnetic field. For instance, if the phase is 90 degrees apart, the coils will be placed 90 degrees relative to each other. If the phase is 60 degrees apart, then the coils will be placed 60 degrees relative to each other. The transponder signal modulated on the composite magnetic field can then be detected and processed.

An impedance matching network, as discussed above, can also be provided for each coil. Furthermore, a precession coil may also be provided to prevent any unfavorable orientations between the transponder and the interrogator from occurring. Therefore, an interrogator may be provided with a magnetic field that provides a multidimensional magnetic field. The magnetic field may vary in phase or direction and may make a complete rotation around an axis of symmetry. There may be two or more coils driven from a polyphase AC signal and the interrogator may also incorporate an impedance matching network for one or more of the coils. In addition, an audio transducer may be provided to assist in locating a transponder's location.

Having thus described preferred embodiments of the impedance matching network and multidimensional electromagnetic field coil, it should be apparent to those skilled in the art that certain advantages of the within system have been achieved. It should also be appreciated that various modifications, adaptations, and alternative embodiments thereof may be made within the scope and spirit of the present invention. For example, an inductively coupled identification system has been illustrated to show various embodiments of the present invention, but it should be apparent that the inventive concepts described above would be equally applicable to other applications utilizing inductive coupling and impedance matching. Accordingly, the scope of the invention is intended to be limited and/or defined only by the proper interpretation of the following claims.

What is claimed is:

1. A radio frequency identification system, interrogator, comprising:
   a first antenna adapted to generate a first magnetic field component having a first phase;
   a second antenna adapted to generate a second magnetic field component having a second phase;
   a driver circuit coupled to the first and second antennae to provide at least one signal to cause the generation of first and second magnetic field components; whereby a first and second magnetic fields form a time varying composite magnetic field;
   a detector for detecting a transponder signal modulated on said magnetic field;
   a processor for processing the transponder signal; and
   wherein said processor further comprises:
      at least one potentiometer coupled to said detector and adapted to nullify interference on said detected signal;
      an amplifier coupled to said at least one potentiometer and adapted to amplify said detected signal;
      a filter coupled to said amplifier and adapted to filter said detected signal;
      a demodulator coupled to said filter and adapted to demodulate said detected signal;
      at least one decoder coupled to said demodulator and adapted to decode said demodulated signal; and
      a signal processor coupled to said at least one decoder and adapted to process said decoded signal.

2. The interrogator of claim 1, wherein the first antenna and the second antenna are positioned substantially perpendicular to each other and the first phase magnetic field component and the second phase magnetic field component are in quadrature.

3. The interrogator of claim 1, further comprising:
   a first capacitor having a first end and a second end opposite said first end, said first end of said first capacitor coupled to a first end of said first antenna, said second end of said first capacitor coupled to a second end of said first antenna; and
   a second capacitor having a first end and a second end opposite said first end, said first end of said second capacitor coupled to a first end of said second antenna, said second end of said second capacitor coupled to a second end of said second antenna.

4. The interrogator of claim 1, wherein said detector further comprises a pickup coil positioned perpendicular to both of said first and second antennae.

5. The interrogator of claim 1, wherein said driver circuit further comprises:
   an oscillator adapted to generate a first signal at twice a carrier frequency; and
   a phase splitter coupled to said oscillator and adapted to split said first signal into an in-phase component to be provided to said first antenna and a quadrature phase component to be provided to said second antenna.

6. The interrogator of claim 1, further comprising a display coupled to said processor, wherein paid processor provides said processed signal to said display, said display adapted to display said processed signal in a format understandable by a user.

7. The interrogator of claim 1, further comprising an audio transducer coupled to said processor, said audio transducer adapted to receive a signal from said processor and produce an audible tone when a transponder is detected.

8. The interrogator of claim 1, further comprising a third antenna adapted to generate a third magnetic field component, said driver further coupled to said third antenna and driving said third antenna with a signal to generate said third magnetic field component to precess paid composite magnetic field.

9. The interrogator of claim 8, wherein said third antenna is perpendicular to said first and second antenna.

10. The interrogator of claim 8, further comprising a capacitor having a first end and a second end opposite said first end, said capacitor disposed between said third antenna and said driver, said first end coupled to said driver, and said second end coupled to a first end of said third antenna.

11. The interrogator of claim 10, further comprising a second capacitor having a first end and a second end opposite said first end, said second capacitor disposed between said capacitor and said third antenna, said first and second end of said second capacitor coupled to a first and second end of said third antenna, respectively.

12. The interrogator of claim 1, wherein the driver circuit provides a time varying signal to cause said composite magnetic field to rotate.

13. The interrogator of claim 1, further comprising a third antenna which generates a third magnetic field component which precesses said composite magnetic field.

14. An interrogator for an identification system, comprising:
  a first coil;
  a second coil;
  a driver coupled to and driving said first coil and said second coil by providing a time varying signal to each of said first and second coils to cause said coils to generate a rotating magnetic field;
  a detector for detecting transponder signal modulated on said rotating magnetic field; and
  a processor for processing said transponder signal;
  wherein said processor further comprises: at least one potentiometer coupled to said detector and adapted to nullify interference on said transponder signal; an amplifier coupled to said at least one potentiometer and adapted to amplify said transponder signal; a filter coupled to said amplifier and adapted to filter said transponder signal; a demodulator, coupled to said filter and adapted to demodulate said transponder signal; at least one decoder coupled to said demodulator and adapted to decode said transponder signal; and a signal processor coupled to said at least one decoder and adapted to process said transponder signal.

15. The interrogator of claim 14, wherein said driver splits a generated signal into an in-phase component to drive said first coil and a quadrature phase component to drive said second coil.

16. A radio frequency identification system interrogator, comprising:
  a first antenna adapted to generate a first magnetic field component having a first phase;
  a second antenna adapted to generate a second magnetic field component having a second phase;
  a driver circuit coupled to the first and second antennae to provide at least one signal to cause the generation of first and second magnetic field components; whereby said first and second magnetic fields form a time varying composite magnetic field; and
  a third antenna adapted to generate a third magnetic field component, said driver further coupled to said third antenna and driving said third antenna with a signal to generate said third magnetic field component to precess said composite magnetic field.

17. The interrogator of claim 16, wherein said third antenna is perpendicular to said first and second antennae.

18. The interrogator of claim 16, further comprising a capacitor having a first end an a second end opposite said first end, said capacitor disposed between said third antenna and said driver, said first end coupled to said driver, and said second end coupled to a first end of said third antenna.

19. The interrogator of claim 18, further comprising a second capacitor having a first end and a second end opposite said first end, said second capacitor disposed between said capacitor and said third antenna, said first and second end of said second capacitor coupled to a first and second end of said third antenna, respectively.

20. A radio frequency identification system interrogator, comprising:
  a first antenna adapted to generate a first magnetic field component having a first phase;
  a second antenna adapted to generate a second magnetic field component having a second phase;
  a driver circuit coupled the first and second antennae to provide at least one signal to cause the generation of first and second magnetic field components; whereby said first and second magnetic field components form a time varying composite magnetic field; and
  a third antenna which generates a third magnetic field component which precesses said composite magnetic field.

21. A radio frequency identification system interrogator, comprising:
  a first antenna adapted to generate a first magnetic field component having a first phase;
  a second antenna adapted to generate a second magnetic field component having a second phase;
  a driver circuit coupled to the first and second antennae to provide at least one signal to generate first and second magnetic field components; whereby said first and second magnetic field components form a time varying composite magnetic field; and
  a series drive capacitor for each of said antennae and through which said antennae are driven, and a parallel tank capacitor for each said antenna, wherein said series drive capacitor and said parallel tank capacitor provide an impedance matching network.

22. The interrogator of claim 21, further comprising a detector for detecting a transponder signal modulated on said magnetic field.

23. The interrogator of claim 22, further comprising a processor for processing the transponder signal.

24. The interrogator of claim 23, further comprising a display coupled to said processor, wherein said processor provides said processed signal to said display, said display adapted to display said processed signal in a format understandable by a user.

25. The interrogator of claim 23, further comprising an audio transducer coupled to said processor, said audio transducer adapted to receive a signal from said processor and produce an audible tone when a transponder is detected.

26. The interrogator of claim 22, wherein said detector further comprises a pickup coil positioned perpendicular to both of said first and second antennae.

27. The interrogator of claim 21, wherein said first antenna and said second antenna are positioned substantially perpendicular to each other and said first phase magnetic field component and said second phase magnetic field component are in quadrature.

28. The interrogator of claim 21, wherein said driver circuit includes: an oscillator adapted to generate a first signal at twice a carrier frequency; and a phase splitter coupled to said oscillator and adapted to split said first signal into an in-phase component to be provided to said first antenna and a quadrature phase component to be provided to said second antenna.

29. The interrogator of claim 21, further comprising a third antenna adapted to generate a third magnetic field component, said driver further coupled to said third antenna and driving said third antenna with a signal to generate said third magnetic field component to precess said composite magnetic field.

30. The interrogator of claim 21, wherein said third antenna is perpendicular to said first and second antennae.

31. The interrogator of claim 21, wherein said driver circuit provides a time varying signal to cause said composite magnetic field to rotate.

32. An interrogator for an inductively-coupled identification system, comprising:
   a plurality of coil means for generating a composite rotating magnetic field having an approximately constant amplitude in all orientations relative to a transponder; and
   a series drive capacitor for each of said coil means and through which said coil means are driven, and a parallel tank capacitor for each of said coil means, wherein said series drive capacitors and said parallel tank capacitors provide an impedance matching network.

33. The interrogator of claim 32, wherein said series drive capacitor and said parallel tank capacitors are adapted to allow the independent adjustment of both resonant frequency and input impedance of the interrogator.

34. The interrogator of claim 32, wherein said plurality of coil means includes a first coil adapted to generate a first magnetic field component having a first phase and a second coil adapted to generate a second magnetic field component having a second phase.

35. The interrogator of claim 34, wherein said first and second coils are positioned substantially perpendicular to each other.

36. The interrogator of claim 34, wherein said first phase and said second phase are in quadrature.

37. The interrogator of claim 34, further comprising a pickup coil positioned perpendicular to both of said first and second coils.

38. The interrogator of claim 32, further comprising a detector which detects a transponder signal modulated on said composite rotating magnetic field.

39. The interrogator of claim 38, further comprising a processor which processes said transponder signal.

40. The interrogator of claim 32, further comprising a precession coil which generates a magnetic field component to precess said composite rotating magnetic field.

41. The interrogator of claim 40, wherein said precession coil is aligned relative to said plurality of coil means and driven with a signal offset in frequency from at least one signal driving said plurality of coil means.

42. The interrogator of claim 32, wherein said composite rotating magnetic field does not make a complete rotation and changes direction sufficiently to capture transponders with unfavorable orientations.

43. The interrogator of claim 32, wherein interrogator coils of said plurality of coil means are disposed perpendicular to one another.

44. The interrogator of claim 43, wherein a transponder in the plane of the axes of said coils senses an alternating magnetic field of full amplitude regardless of the angle of a transponder coil of the transponder with respect to said coils of the interrogator.

45. An inductively-coupled identification system interrogator, comprising:
   coil means for generating a composite rotating magnetic field having an approximately constant amplitude in all orientations relative to a transponder; and
   said coil means including a series drive capacitor for each coil of said coil means and through which said coils are driven, and a parallel tank capacitor for each of said coils, wherein said series drive capacitors and said parallel tank capacitors together allow for the independent adjustment of both resonant frequency and input impedance of the interrogator.

* * * * *